US010821357B1

(12) United States Patent
Rotelli et al.

(10) Patent No.: US 10,821,357 B1
(45) Date of Patent: Nov. 3, 2020

(54) INTERACTING USING AN ELECTRONIC LINK

(71) Applicant: Amazon Technologies, Inc., Seattle, WA (US)

(72) Inventors: Ilia Rotelli, Seattle, WA (US); Christopher Navin Stewart, Mission Viejo, CA (US); Syed Suhaib Sarmad Barbero, Irvine, CA (US); Troy Allen Woolman, Seattle, WA (US)

(73) Assignee: Amazon Technologies, Seattle, WA (US)

( * ) Notice: Subject to any disclaimer, the term of this patent is extended or adjusted under 35 U.S.C. 154(b) by 475 days.

(21) Appl. No.: 15/084,428

(22) Filed: Mar. 29, 2016

(51) Int. Cl.
*A63F 13/35* (2014.01)
*H04L 29/06* (2006.01)

(52) U.S. Cl.
CPC .............. *A63F 13/35* (2014.09); *H04L 67/38* (2013.01)

(58) Field of Classification Search
CPC ................................. A63F 13/35; H04L 67/38
See application file for complete search history.

(56) References Cited

U.S. PATENT DOCUMENTS

| | | | | |
|---|---|---|---|---|
| 8,015,547 B2 * | 9/2011 | Harvey | ................... | H04L 67/12 717/117 |
| 9,876,827 B2 * | 1/2018 | Chew | ..................... | G06Q 10/10 |
| 10,105,608 B1 * | 10/2018 | George | .................. | A63F 13/86 |
| 2002/0023009 A1 * | 2/2002 | Ikeda | ..................... | G06Q 30/06 705/26.8 |
| 2002/0191600 A1 * | 12/2002 | Shah | ....................... | H04L 29/06 370/389 |
| 2008/0195507 A1 * | 8/2008 | Ratnakar | ............ | G06Q 30/0603 705/26.8 |
| 2009/0055292 A1 * | 2/2009 | Chong | ............... | G06Q 30/0643 705/26.3 |
| 2009/0177977 A1 * | 7/2009 | Jones | ..................... | G06N 3/006 715/753 |
| 2011/0307807 A1 * | 12/2011 | Norby | .................. | G06Q 10/101 715/758 |

(Continued)

OTHER PUBLICATIONS

Wikipedia Article on Spanning Tree Protocol, 2019, https://en.wikipedia.org/w/index.php?title=Spanning_Tree_Protocol&oldid=902491776, printed Jun. 28, 2019.*

(Continued)

*Primary Examiner* — Corbett B Coburn
(74) *Attorney, Agent, or Firm* — Thorpe North & Western, LLP.

(57) ABSTRACT

Technology is described for electronic game interaction. A request may be received to generate an electronic link for an electronic game session hosted by a game server in a computing service environment. The electronic link may enable one or more game interactions to be performed with the electronic game session. The electronic link may be generated for the electronic game session to include link information. The link information may include one or more game parameters associated with the electronic game session that are to be included in the electronic link. The electronic link may be provided for inclusion in an electronic page. An activation of the electronic link by a target gaming device may enable the target gaming device to perform a game interaction with the electronic game session.

19 Claims, 10 Drawing Sheets

(56) References Cited

U.S. PATENT DOCUMENTS

| | | | | |
|---|---|---|---|---|
| 2012/0178536 A1* | 7/2012 | Oh | ................. | H04L 12/1822 |
| | | | | 463/42 |
| 2013/0090170 A1* | 4/2013 | Reed | ................. | A63F 13/12 |
| | | | | 463/42 |
| 2013/0151518 A1* | 6/2013 | Lampinen | ................. | H04L 67/38 |
| | | | | 707/736 |
| 2013/0303290 A1* | 11/2013 | Nishiya | ................. | A63F 13/005 |
| | | | | 463/42 |
| 2013/0339159 A1* | 12/2013 | Shaikh | ................. | G06Q 30/0643 |
| | | | | 705/14.73 |
| 2014/0006517 A1* | 1/2014 | Hsiao | ................. | G06Q 50/01 |
| | | | | 709/205 |
| 2014/0019882 A1* | 1/2014 | Chew | ................. | G06Q 10/10 |
| | | | | 715/753 |
| 2014/0128163 A1* | 5/2014 | Almog | ................. | A63F 13/12 |
| | | | | 463/42 |
| 2014/0200934 A1* | 7/2014 | Agarwala | ................. | G06Q 10/02 |
| | | | | 705/5 |
| 2014/0372963 A1* | 12/2014 | Chandaria | ................. | G06F 8/00 |
| | | | | 717/100 |
| 2015/0312202 A1* | 10/2015 | Gabbidon | ................. | H04L 51/32 |
| | | | | 709/206 |
| 2015/0348165 A1* | 12/2015 | Kuroki | ................. | G06Q 30/0631 |
| | | | | 705/26.7 |
| 2016/0057220 A1* | 2/2016 | Gibbs | ................. | G06F 8/65 |
| | | | | 709/203 |
| 2016/0236095 A1* | 8/2016 | Joo | ................. | A63F 13/12 |
| 2016/0378439 A1* | 12/2016 | Straub | ................. | G06F 8/34 |
| | | | | 717/107 |
| 2017/0032450 A1* | 2/2017 | Jia | ................. | G06Q 10/083 |

OTHER PUBLICATIONS

What is Session ID, 2019, https://searchsoftwarequality.techtarget.com/definition/session-ID 4/, Printed Jun. 28, 2019.*

* cited by examiner

INTERACTING USING AN ELECTRONIC LINK

BACKGROUND

The popularity of online multiplayer electronic games have increased in recent years due to improvements in network speeds and processing power. Online multiplayer electronic games may be played using gaming devices around the world via the Internet. Each gaming device may execute a game client that connects to a game server (or host server) to play the online multiplayer electronic game. The game server may receive and process input from the gaming devices. The game server may be an authoritative source of events in the online multiplayer electronic game. For example, the game server may transmit data about its internal game state to the game clients, which may allow the game clients to maintain their own accurate version of the game world. As a result, each game client may have its own unique game world perspective.

Online multiplayer electronic games are popular due to the interactive and social component of such electronic games. Friends and/or family members may enjoy playing electronic games with each other (e.g., on the same team or against each other). External studies have also shown that users enjoy playing with known individuals as opposed to playing with strangers. In one example, a user may send an invitation to another user or a group of users (e.g., friends and/or family members) to join the electronic game, and recipients may accept the invitation to join the electronic game.

DETAILED DESCRIPTION

Figure 1:
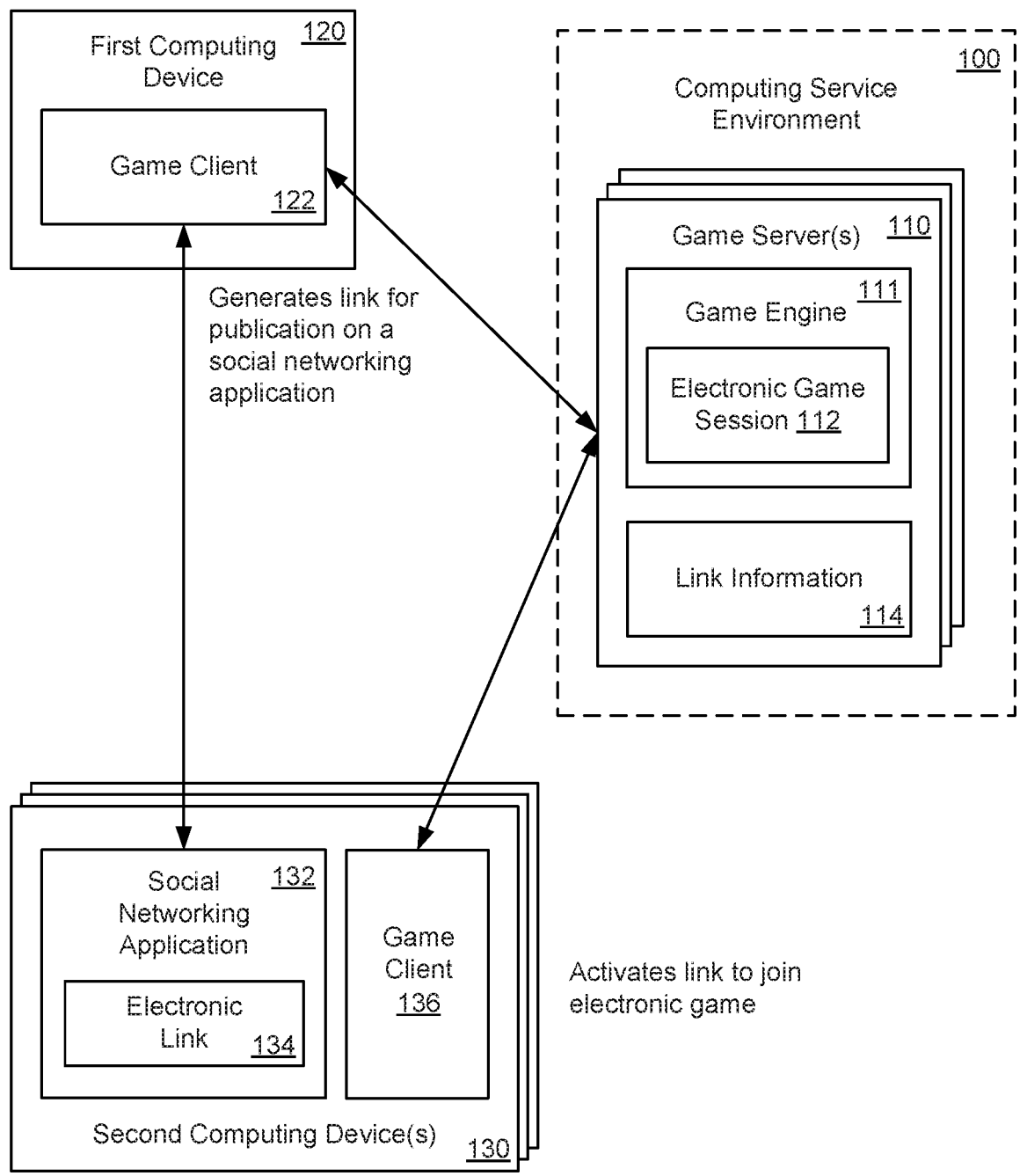
FIG. 1 illustrates a system and related operations for generating an electronic link that enables a computing device to join an electronic game session according to an example of the present technology.

A technology is described for generating electronic links that direct a computing device to join an electronic game session or view a live broadcast of an electronic game session. The electronic link may include link information associated with the electronic game session or the live broadcast of the electronic game session. The electronic link may be provided to the computing device via an electronic page, such as a social networking application or a video channel application. The computing device may activate the electronic link to join the electronic game session or view the live broadcast of the electronic game session depending on the link information included in the electronic link.

In a first configuration, a game client of a first gaming device may initiate an electronic game session, and the electronic game session may be hosted on a game server in a computing service environment. Alternatively, the electronic game session may already be running when the first gaming device connects to the electronic game session. For example, the electronic game session may be initiated by another gaming device or the electronic game session may be automatically launched at the game server at a predefined time in accordance with a schedule. The electronic game session may be maintained at the game server, and the game client may connect to the electronic game session via the game server. In addition, the system may include, for example in the game server or through a video streaming/sharing service or platform, the ability to broadcast output streams of games. The broadcast of the game sessions allows multiple persons to request to view or subscribe to receive streamed output of game playing of a particular player. A single game player may have hundreds of people who subscribe to receive streamed output of games participated in by the particular game player.

In one example, the first gaming device may receive instructions via a user interface to generate an electronic link for the electronic game session. The electronic link, when obtained by a second gaming device, may enable one or more game interactions to be performed by the second gaming device. The game interactions performed by the second gaming device may depend on a type of electronic link generated at the first gaming device. For example, the first gaming device may generate a play link, a broadcast link or a retail link. The play link may enable the second gaming device to perform the action of immediately joining the electronic game session hosted at the game server. The broadcast link may enable the second gaming device to perform the action of watching a live broadcast of gameplay of the specific electronic session. The retail link may enable the second gaming device to perform the action of visiting a virtual retail store associated with the electronic game session to purchase virtual game items.

In another example, after receiving the instructions to generate the electronic link, the first gaming device may request link information from the game server that is hosting the electronic game session. The first gaming device may receive the link information from the game server, and the link information may include data to be included in the electronic link. For example, the link information may include identifiers, tags, or metadata associated with the electronic game session. In addition, the link information may include various game parameters that describe or characterize the electronic game session, such as authentication parameters, session parameters (e.g., a unique session ID, server ID, port ID), group parameters, electronic game parameters, virtual location parameters and/or virtual state parameters. Based on the link information received from the game server, the first gaming device may generate the electronic link. In other words, the first gaming device may generate the electronic link to include the link information. The electronic link that is generated at the first gaming device may be a uniform resource indicator (URI), such as a uniform resource locator (URL), which includes the link information.

In yet another example, the first gaming device may provide the electronic link for publication on an electronic page, such as a social networking platform or an electronic message to be communicated to the second gaming device. The electronic link may be a hypertext transfer protocol (HTTP) link. The second gaming device may obtain or select the electronic link from the social networking platform or the electronic message, and the electronic link may enable the second gaming device to perform a type of game interaction with the electronic game session depending on the link information included in the electronic link. For example, depending on the link information included in the electronic link, the second gaming device may join the electronic game session, view the electronic game session via a broadcast, or visit a virtual store associated with the electronic game session to purchase virtual game items.

In a second configuration, a client device may execute a video channel application that is dedicated to a video channel in a video sharing platform. In other words, the video channel may include one or more videos that are accessible via the video channel application installed on the client device. The video channel may be dedicated to a channel administrator (i.e., a particular user), and videos created by the channel administrator may be uploaded to the video channel and viewable via the video channel application.

In one example, a server connected to the client device may detect when the channel administrator is currently playing an electronic game related to the video channel and a live gameplay of the electronic game is being broadcasted via a video streaming service. Such information may be indicated in an administrator account associated with the video channel. The administrator account may be paired with a game account associated with the channel administrator. The game account may track when the channel administrator is currently playing the electronic game and broadcasting the live gameplay via the video streaming service, and the game account may provide this information to the administrator account. Therefore, the server connected to the client device may determine, based on the administrator account, when the channel administrator is playing an electronic game and broadcasting a live gameplay of the electronic game.

For this scenario, the server may send an alert to the video channel application executing on the client device, and the alert may indicate that the channel administrator associated with the video channel is currently playing the electronic game and a live gameplay of an electronic game session is being broadcasted via the video streaming service. In addition, the alert may include an electronic link with link information that, when obtained by or selected by the client device, enables the client device to connect to a live broadcast of the electronic game session. As another example, the alert may include an electronic link with link information that, when obtained by the client device, connects the client device to an electronic retail store that sells retail merchandise associated with the video channel.

FIG. 1 illustrates an example of a system and related operations for generating electronic links that enable computing devices to join electronic game sessions. A first computing device 120 may execute a game client 122 that communicates with a game server 110. The game server 110 may be included in a computing service environment 100 or another server environment. The game server 110 may host an electronic game session 112 using a game engine 111. In one example, the game client 122 on the first computing device 120 may receive instructions via a user interface to generate an electronic link 134 for joining the electronic game session 112. The first computing device 120 may request link information 114 from the game server 110 via a network, and the game server 110 may provide the link information 114 to the first computing device 120. The link information 114 may include data to be included in the electronic link 134, and the first computing device 120 may generate the electronic link 134 to include the link information 114.

In one example, the first computing device 120 may publish the electronic link 134 on an electronic page, such as an electronic page on a social networking platform, a blog or another electronic page. The first computing device 120 may publish the electronic link 134 as an HTTP link on the electronic page. The second computing device 130 may access the electronic link 134 on the electronic page via a social networking application 132 that is executing on the second computing device 130 or accessed via the second computing device 130 through a browser, or the second computing device 130 may access the electronic link 134 on the electronic page via a browser. Alternatively, the first computing device 120 may transmit an electronic message to the second computing device 130, and the electronic message may include the electronic link 134.

In one example, the second computing device 130 may activate the electronic link 134, and the activation of the electronic link 134 may cause the second computing device 130 to launch a game client 136 on the second computing device 130. Based on the link information 114 included in the electronic link 134, the game client 136 on the second computing device 130 may connect with the electronic game session 112. Therefore, the first computing device 120 and the second computing device 130 may play together by each connecting to the electronic game session 112 hosted by the game server 110.

In one example, the present technology enables a user to interact with other users when playing an electronic game in a simple and straightforward manner. For example, the user may initiate an electronic game session (e.g., start a first person shooter game) and wish for friends and/or family members to join the electronic game session. The user may select an option to generate an electronic link for the electronic game session, and the user may publish the electronic link on a social networking platform and/or include the electronic link in an electronic message communicated to a selected group of individuals. When other users view the electronic link displayed on the social networking platform and/or via the electronic message, the electronic link may be activated or accessed to join the electronic game session. The activation of the electronic link may place the other users in a virtual lobby ready to join the electronic game session or put the users directly into a game session at a specific virtual location in the game ready to play. As a result, the user that starts the electronic game session may conveniently invite other users to join the electronic game session by creating and publishing the electronic link.

In contrast, prior solutions involve the user performing a number of steps to invite other users to join the electronic game session. For example, in prior solutions, the user may login and authenticate themselves to a gaming communication system and provide his/her user name to the other users. Based on the user name, the users may become friends within the electronic game. At this point, the user may be able to send invitations to the other users to join a gaming session (e.g., join a gaming group within the game). In addition, both the user initiating the electronic game and/or the other users may need to launch game clients on their respective devices in order to send invitations to join the electronic game. Thus, prior solutions involve a relatively large number of steps to be performed in order for users to play electronic games with each other in a virtual environment. With the present technology, a user may start an electronic game and publish an electronic link to join the electronic game on various social channels, and other users that view the electronic link and wish to join the electronic game may simply activate the electronic link to launch a game client on their respective device and join the electronic game.

Figure 2:
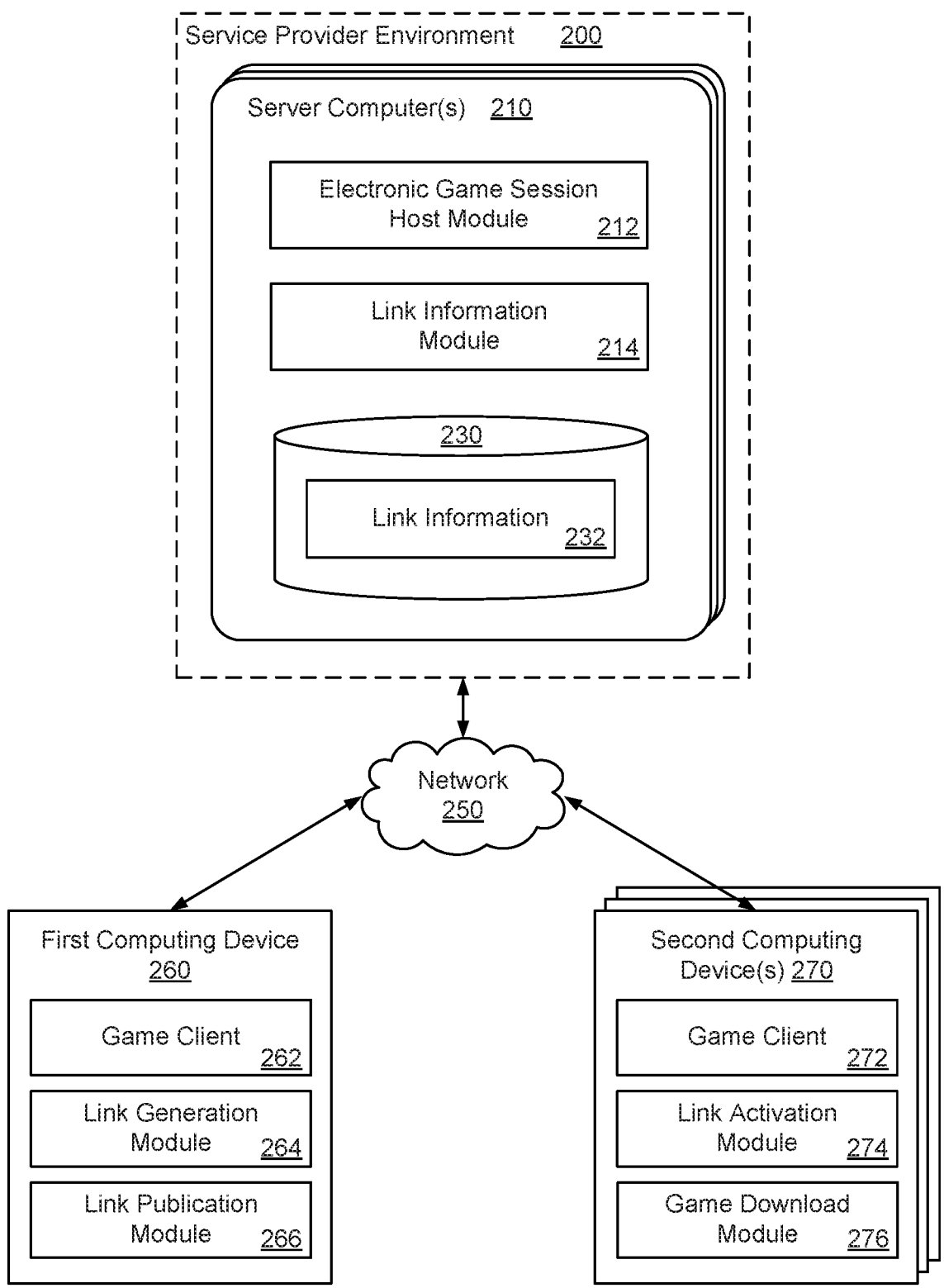
FIG. 2 is an illustration of a networked system for generating an electronic link that enables a computing device to join an electronic game session according to an example of the present technology.

FIG. 2 illustrates components of an example service provider environment 200 according to one example of the present technology. The service provider environment 200 may include a server computer 210. The server computer 210 may be in communication with a number of devices via a network 250, such as a first computing device 260 and a second computing device 270. The server computer 210 may contain a data store 230 and a number of server computers 210 with modules for hosting an electronic game session and providing link information that enables the second computing device 270 to join or view the electronic game session.

The data stored in the data store 230 may include link information 232. The link information 232 may be associated with an electronic game session that is hosted at the server computer 210 via an electronic game session host module 212. The link information 232 may include data to be included in an electronic link generated for the electronic game session. The link information 232 may include identifiers, tags, or metadata associated with the electronic game session. In addition, the link information 232 may include various game parameters that describe or characterize the electronic game session, such as authentication parameters, session parameters (e.g., a unique session ID, server ID, port ID), group parameters, electronic game parameters, virtual location parameters and/or virtual state parameters. The link information 232 for the electronic game session may be a custom scheme that is defined particularly for the electronic game session.

The server computer 210 may include an electronic game session host module 212, a link information module 214, and other applications, services, processes, systems, engines, or functionality not discussed in detail herein. The electronic game session host module 212 may be configured to host an electronic game session that is accessible to the first computing device 260 and the second computing device 270. The electronic game session host module 212 may generate a virtual environment and game associated with the electronic game session, and the electronic game session host module 212 may provide information to the first computing device 260 and the second computing device 270 that enables interaction with the virtual environment. In addition, the electronic game session host module 212 may host a variety of electronic game sessions, such as electronic game sessions related to sports, action, strategy, etc.

The link information module 214 may be configured to receive a request from the first computing device 260 for the link information 232 associated with the electronic game session. The link information module 214 may identify the link information 232 related to the electronic game session hosted by the electronic game session host module 212. The link information module 214 may transmit the link information 232 to the first computing device 260.

In one example, the first computing device 260 may execute a game client 262, and the first computing device 260 may include a link generation module 264 and a link publication module 266. The game client 262 on the first computing device 260 may connect to the electronic game session host module 212 and receive information related to the electronic game session hosted by the electronic game session host module 212. The link generation module 264 may generate an electronic link (e.g., an HTTP link) based on the link information 232. The electronic link may be a uniform resource indicator (URI), such as a uniform resource locator (URL), which includes the link information 232. As an example, the link generation module 264 may generate a play link to include link information 232 that enables the second computing device 270 to join the electronic game session hosted by the electronic game session host module 212. As another example, the link generation module 264 may generate a broadcast link to include link information 232 that enables the second computing device 270 to watch a live broadcast of the electronic game session hosted by the electronic game session host module 212. As yet another example, the link generation module 264 may generate a retail link to include link information 232 that enables the second computing device 270 to visit a virtual store within the electronic game session to purchase virtual items. In addition, the link publication module 266 may publish the electronic link (e.g., the play link, broadcast link or retail link) on an electronic page to be viewed by a user associated with the second computing device 270. For example, the electronic page may be part of a social networking platform, blog, electronic site, forum, chat room, message board, video sharing platform, image sharing platform, music sharing platform, or as part of an electronic message transmitted to the second computing device 270.

In one example, the second computing device 270 may execute a game client 272, and the second computing device 270 may include a link activation module 274 and a game download module 276. The game client 272 on the second computing device 270 may connect to the electronic game session host module 212. The link activation module 274 may activate the electronic link (e.g., the play link, broadcast link, or retail link) from the electronic page, and then trigger an appropriate action to be performed on the second computing device 270. For example, the link activation module 274 may launch the game client 272 when a play link or retail link is activated. The link activation module 274 may pass various game parameters from the electronic link to the game client 272. In another example, the link activation module 274 may trigger a video streaming application to be launched on the second computing device 270 when a broadcast link is activated. In one example, after activation of the electronic link, the game download module 276 may detect that the game client 272 is not installed on the second computing device 270. Therefore, the game download module 276 may direct the second computing device 270 to an electronic retail store to download and install the game client 272 on the second computing device 270.

The first computing device 260 and the second computing device 270 are representative of a plurality of client devices that may be coupled to the network 250. The first computing device 260 and the second computing device 270 may comprise, for example, a processor-based system such as a computer system. Such a computer system may be embodied in the form of a desktop computer, a laptop computer, cellular telephones, smartphones, set-top boxes, network-enabled televisions, tablet computer systems, game consoles, or other devices with like capability.

The first computing device 260 and the second computing device 270 may be configured to execute various applications, such as a browser and/or other applications. The applications may also correspond to code that is executed in the browser (e.g., web applications). The applications may also correspond to standalone applications, such as networked applications. In addition, the client 280 may be configured to execute applications 284 that include, but are not limited to, gaming applications, shopping applications, video playback applications, standalone applications, email applications, instant message applications, and/or other applications.

The first computing device 260 and the second computing device 270 may include or be coupled to an output device. The browser may be executed, for example, to access and render network pages (e.g. web pages) or other network content served up by the server computer 210 and/or other servers. The output device may comprise, for example, one or more devices such as cathode ray tubes (CRTs), liquid crystal display (LCD) screens, gas plasma-based flat panel displays, LCD projectors, or other types of display devices, etc. In addition, the output device may include an audio device, tactile device (e.g., braille machine) or another output device to feedback to a user.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
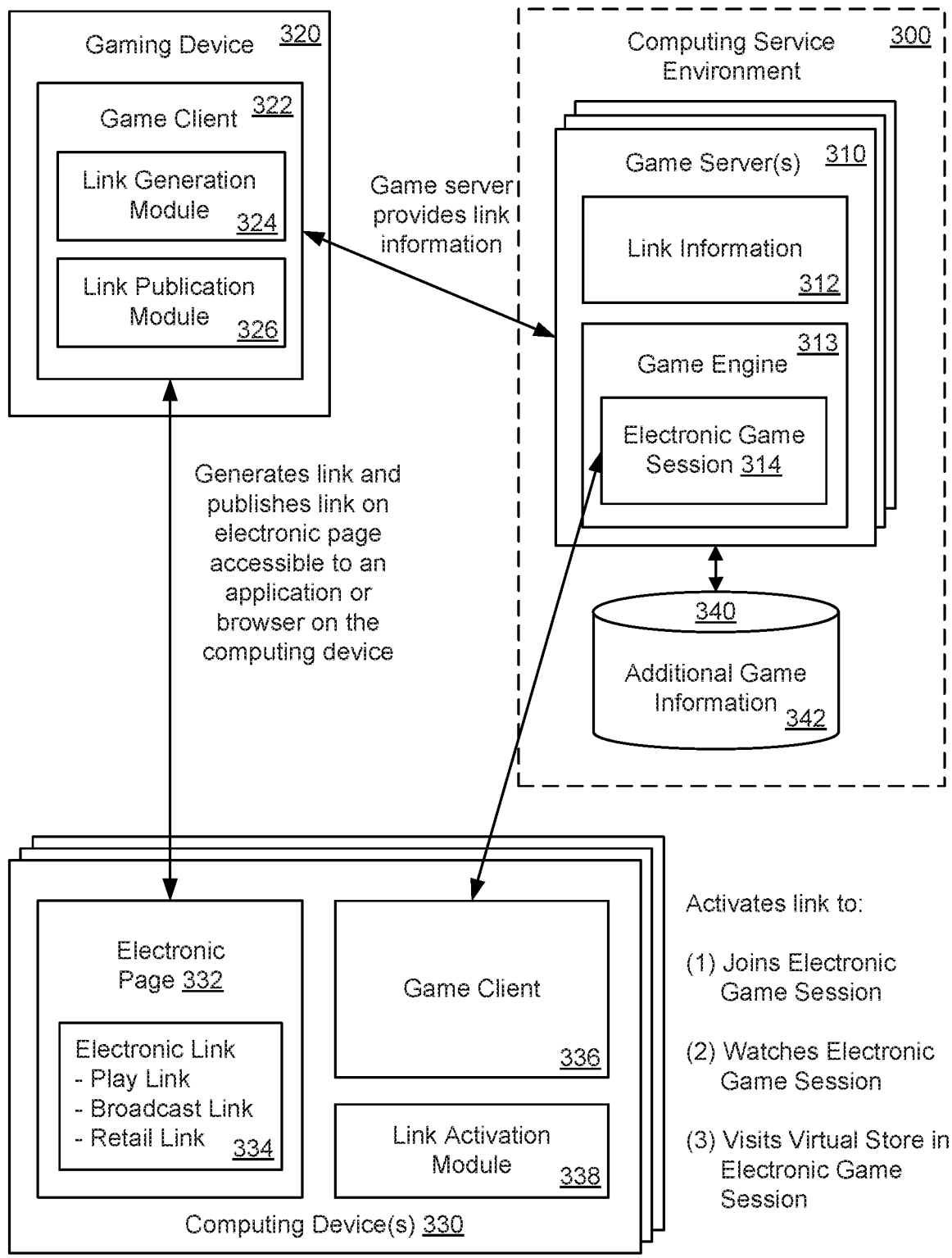
FIG. 3 illustrates a system and related operations for generating an electronic link that enables a computing device to access, view or visit a virtual store associated with an electronic game session according to an example of the present technology.

FIG. 3 illustrates an example of a system and related operations for generating electronic links that enable computing devices to join, view or visit a virtual store associated with electronic game sessions. A gaming device 320, via a game client 322 installed on the gaming device 320, may initiate an electronic game session 314 using a game engine 313. The electronic game session 314 may be launched on a game server 310 and the game server 310 may be part of a computing service environment 300. In other words, the electronic game session 314 may be hosted at the game server 310, and the game client 322 may connect to the electronic game session 314 via the game server 310. Alternatively, the electronic game session 314 may already be running when the gaming device 320 connects to the electronic game session 314. For example, the electronic game session 314 may be initiated by another gaming device or the electronic game session 314 may be automatically launched at the game server 310 at a predefined time in accordance with a schedule.

In one example, a user associated with the gaming device 320 may wish to invite friends and/or family members to join the electronic game session 314. In other words, the user may start the electronic game session 314, and then wish for others to join the electronic game session 314, or alternatively, the user may be in a virtual lobby waiting for others to join him prior to starting the electronic game session 314. In another example, the user associated with the gaming device 320 may wish to invite fans, friends and/or family members to watch a gameplay of the electronic game session 314 via a live broadcast. In yet another example, the user associated with the gaming device 320 may wish to promote virtual items from the electronic game session 314 to friends and/or family members.

In such examples, the gaming device 320 may receive instructions via a user interface to generate an electronic link 334 for the electronic game session 314. The electronic link 334, when activated by a computing device 330 (e.g., a computing device associated with one of the friends or family members), may enable one or more game interactions to be performed by the computing device 330 depending on the type of electronic link 334. As an example, the gaming device 320 may receive instructions to generate a play link, which when activated by the computing device 330, may enable the computing device 330 to join the electronic game session 314. As another example, the gaming device 320 may receive instructions to generate a broadcast link, which when activated by the computing device 330, may enable the computing device 330 to view a live broadcast of the electronic game session 314. As yet another example, the gaming device 320 may receive instructions to generate a retail link, which when activated by the computing device 330, may enable the computing device 330 to visit a virtual store associated with the electronic game session 314 to purchase virtual game items.

In one example, after receiving the instructions to generate the electronic link 334 (e.g., the play link, broadcast link or retail link), the gaming device 320 may request link information 312 from the game server 310 that is hosting the electronic game session 314. The link information 312 may be maintained for the electronic game session 314 at the game server 310. The link information 312 may include data to be included in the electronic link 334. In one example, the link information 312 may include identifiers, tags, or metadata associated with the electronic game session 314. In addition, the link information 312 may include various game parameters that describe or characterize the electronic game session 314, such as authentication parameters, session parameters (e.g., a unique session ID, server ID, port ID), group parameters, electronic game parameters, virtual location parameters and/or virtual state parameters.

In one example, after receiving the link information 312 from the game server 310, the gaming device 320 may generate the electronic link 334 (e.g., the play link, broadcast link or retail link) which includes the link information 312. The electronic link 334 may be a uniform resource indicator (URI), such as a uniform resource locator (URL), which includes the link information 312. In one example, the electronic link 334 generated by the gaming device 320 may be a hypertext transfer protocol (HTTP) link. The data included in the electronic link 334 may enable the computing device 330 to join, view or visit a virtual store associated with the electronic game session 314.

In one example, the gaming device 320 may provide the electronic link 334 for publication on an electronic page 332, such as a social networking platform, that is associated with the gaming device's user. In other words, the gaming device 320 may publish the electronic link 334 on the social networking platform, such that the electronic link 334 is viewable to the user's friends and family members that are allowed access to the user's social networking platform. In another example, the gaming device 320 may include the electronic link 334 in an electronic message, and the electronic message may be transmitted to the computing device 330. Alternatively, the electronic message with the electronic link 334 may be transmitted to a predefined group of computing devices, and the users associated with the predefined group of computing devices may be friends or family members of the user associated with the gaming device 320.

In one example, the computing device 330 may activate the electronic link 334 from the social networking platform or the electronic message via a link activation module 338. The link activation module 338 may parse the electronic link 334 to detect the link information 312 embedded in the electronic link 334. Based on the type of electronic link 334 (e.g., play link, broadcast link or retail link) and the type of link information 312 embedded in the electronic link 334, the link activation module 338 may trigger one or more game interactions to be performed at the computing device 330 with the electronic game session 314. For example, the computing device 330 may launch a game client 336 and join a virtual lobby or a particular virtual area of the electronic game session 314. As another example, the computing device 330 may launch a browser or video streaming application to view the live broadcast of the electronic game session 314. In yet another example, the computing device 330 may launch the game client 336 and connect to the virtual store to purchase virtual game items. In addition, the link activation module 338 may pass various game parameters from the electronic link 334 to the game client 336.

In one configuration, the activation of the electronic link 334 may cause the computing device 330 to launch the game client 336 and connect to a specific area of the electronic game session 314. For example, each area of the electronic game session 314 may be associated with a unique ID (which is part of the link information 312). Therefore, based on the link information 312 used to generate the electronic link 334, the computing device 330 may connect to specific areas (e.g., screens, levels, geometric partitions, parts of a game word, etc.) of the electronic game session 314.

In one example, the electronic link 334 may include a name of an electronic game or application, a name of a command (or game interaction) to be executed at the gaming device 320 and one or more parameters as <name>=<value> pairs. For example, the name of the electronic game or application may be 'TestApplication', the name of the command (or game interaction) to be performed may be 'JoinGame' and the parameters may be 'sv_port=8080', sv_host=10.10.0.123' and 'invited_by=auser'. In one example, the name of the electronic game or application, the name of the command (or game interaction) to be performed and the one or more parameters may be encoded as a string, such as 'TestApplication JoinGame sv_port=8080 sv_host=10.10.0.123 invited_by=auser'. In addition, since spaces may cause problems in URIs, the string may be converted into Base64 before being passed as a URI. For example, the string may be converted to 'game: QW1hem9uVGVzdEFwcGxpY2F0aW9uIEpvaW5HYW1-IHN2X3BvcnQ9ODA4MCBzdl9 ob3N0PTEwLjEwLjA-uMTIzIGludml0ZWRfYnk9YXVzZXI=', wherein "game" is a scheme/protocol type for the electronic link 334.

In one example, the electronic link 334 (e.g., URI) may be validated at the gaming device 320 before use. The decoded content of the URI may conform to a defined format. If the decoded content of the URI does not conform to the defined format, then the entire URI may be discarded. As an example, the defined format may involve a command identifier, a game identifier and a list of formatted parameter values. The command identifier and the game identifier may be used as keys to find a matching JavaScript Object Notation (JSON) block in a manifest stored at the game server 310. A launch string may be taken from the JSON block, and parameters marked as inputs may be substituted for values from a validated parameter list.

In one example, the gaming device 320 may include separate video streaming software that captures video of the electronic game session 314, encodes the video and uploads the video to a video streaming service, for example located in computing service provider environment 300 or elsewhere. A live broadcast of the electronic game session 314 may be available to the computing device 330 via the video streaming service. The video streaming software may be separate from the game client 322 that is executing on the game client 322. The video streaming software may know link information associated with the live broadcast of the electronic game session 314, and the link information may be included in a broadcast link generated at the gaming device 320 and published on the social networking platform or included in the electronic message.

In one example, game developers may create the electronic game through a software development kit (SDK) in an integrated development environment (IDE). Link generation functionality may be provided to the game developers through the SDK. For example, the link generation functionality may be a pre-built feature in the SDK that may be utilized during development of the electronic game.

In one configuration, the link activation module 338 may parse the electronic link 334 and detect that a game client 336 (or another type of electronic game software) for joining the electronic game session 314 is not currently installed on the computing device 330. The link activation module 338 may direct the computing device 330 to access an electronic retail store to download the game client 336 (or another type of electronic game software). After the game client 336 is downloaded and installed on the computing device 330, the computing device 330 may launch the game client 336 and connect to the electronic game session 314.

In one configuration, the electronic link 334 provided to the electronic page 332 and activated by the computing device 330 may be an information link. In some cases, the link generation module 324 may attempt to generate an electronic link 334 with link information 312 (e.g., parameters) that exceeds a size restriction for the electronic link 334. In this situation, the link generation module 324 may generate the electronic link 334 to include link information associated with an external data store 340 of the game server 310. The external data store 340 may include additional game information 342 associated with the electronic game session 314. For example, the external data store 340 may include additional game information 342 regarding a particular area of the electronic game session 314, status criteria for joining the electronic game session 314, virtual game item criteria for joining the electronic game session 314, etc. In addition, the additional game information 342 may include security keys for the electronic game session 314. As an alternative to including these security keys in the electronic link 334, it may be more secure to include these security keys in the additional game information 342 stored on the external data store 340. The computing device 330 may activate the information link to launch the game client 336 and retrieve the additional game information 342 from the external data store 340 associated with the game server 310. After retrieving the additional game information 342, the computing device 330 may join the electronic game session 314.

In one configuration, the game client 322 on the gaming device 320 may detect when one or more predefined events have occurred in the electronic game session 314. For example, the game client 322 may detect when a specific action is performed, a particular event has occurred, or a certain goal is accomplished within the electronic game session 314. As a non-limiting example, a predefined event may be when a user or team is eliminated from the electronic game session 314. The predefined events may be defined by a user associated with the gaming device 320. When one or more of the predefined events occur in the electronic game session 314, the link generation module 324 of the gaming device 320 may automatically generate an electronic link 334, and the link publication module 326 may publish the electronic link 334 on a social networking platform or transmit an electronic message containing the electronic link 334 to a predefined group of users. Therefore, the users in the predefined group may become notified when such predefined events occur, and the electronic link 334 may enable the predefined group of users to join the electronic game session 314 or view a live broadcast of the electronic game session 314.

In one configuration, the electronic link 334 provided to the computing device 330 may be an HTTP protocol link.

The computing device 330 may activate the electronic link 334 (e.g., the HTTP protocol link), and a redirect scheme on the link activation module 338 may cause a customized electronic game link to be opened at the computing device 330. In one example, the activation of the electronic link 334 may open an HTTP based page, but the HTTP based page may be redirected using arguments to a game client page, which then launches the game client 336 on the computing device 330. For example, the arguments may be passed from the HTTP based page to the game client page in order to launch the game client 336. However, the redirect scheme may be undetectable to a user associated with the computing device 330. The user may simply select the electronic link 334, and the game client 336 may be launched on the computing device 330.

In one configuration, the link generation module 324 in the gaming device 320 may generate an electronic link 334 that enables the computing device 330 to connect to a virtual retail store associated with the electronic game session 314 and be gifted one or more virtual game items from the virtual retail store. The one or more virtual game items to be gifted to the computing device 330 may be selected by the gaming device 320. As a non-limiting example, the gaming device 320 may gift virtual game items, such as weapons, armor, medals, etc. to the computing device 330. These gifted virtual game items may be utilized by the computing device 330 when joining the electronic game session 314 hosted by the game server 310.

In one configuration, the gaming device 320 may not generate the electronic link 334 and publish the electronic link 334 on the electronic page 332. Rather, the game server 310 may generate the electronic link 334 based on the link information 312, and the game server 310 may publish the electronic link 334 on the electronic page 332. As an example, user A may be playing an electronic game and wishes to invite user B to join the electronic game. Users A and B may be members of a same social media platform. User A may have previously permitted the game server 310 to perform actions on its behalf on the social media platform. The game server 310 may perform various actions for user A using a defined authentication protocol for security purposes. Thus, the game server 310 may be authorized to perform the actions such that user A does not reveal their credentials other than to the social media platform. In this example, the generation of the electronic link 334 and the publication of the electronic link 334 may be performed by the game server 310, as opposed to the game client 332 on the gaming device 320. As another example, user A may be notified when user B plays an electronic game. User A may authorize the game server 310 to perform social media activities on its behalf. Therefore, when user B starts playing the electronic game, the game server 310 may notify user A with an electronic link 334 to join the electronic game session 314 or view a broadcast of the electronic game session 314.

Figure 4:
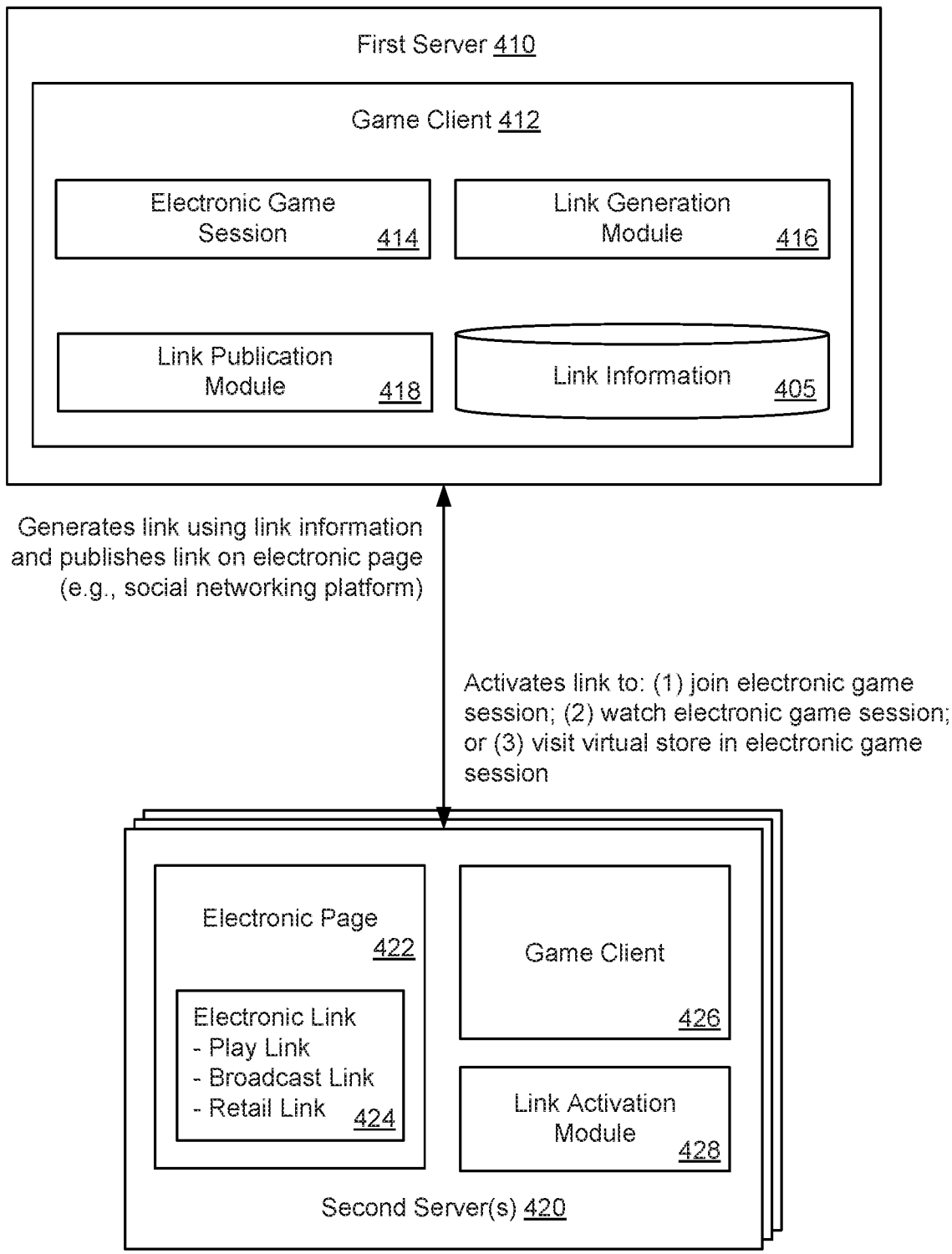
FIG. 4 illustrates a system and related operations for generating an electronic link that enables a computing device to access, view or visit a virtual store associated within an electronic game session in a peer-to-peer network according to an example of the present technology.

FIG. 4 illustrates an example of a system and related operations for generating electronic links that enable computing devices to join, view or visit a virtual store associated with electronic game sessions in a peer-to-peer network. In this configuration, a first server 410 may execute a game client 412 that hosts an electronic game session 414 in the peer-to-peer network, as opposed to a game server hosting the electronic game session (as shown in FIG. 3). The first server 410 may store link information 405 associated with the electronic game session 414. The link information 405 may include various game parameters that describe or characterize the electronic game session 414, such as authentication parameters, group parameters, electronic game parameters, virtual location parameters and/or virtual state parameters. In addition, the link information 405 may include an Internet Protocol (IP) address associated with the first server 410 that is hosting the electronic game session 414.

In one example, the first server 410 may generate, via a link generation module 416 on the first server 410, an electronic link 424. The electronic link 424 may be a play link, a broadcast link or a retail link. The electronic link 424 may be generated to include the link information 405. The first server 410 may publish, via a link publication module 418 on the first server 410, the electronic link 424 on an electronic page. For example, the electronic link 424 may be published on a social networking platform, or the electronic link 424 may be included in an electronic message.

In one example, a second server 420 may activate the electronic link 424 via a link activation module 428 on the second server 420. The electronic link 424 may be activated from an electronic page 422 that is provided to the second server 420. For example, the electronic page may be associated with a social networking application that executes on the second server 420. In another example, the electronic page 422 that includes the electronic link 424 may be provided from a browser that executes on the second server 420. After the electronic link 424 is activated, the second server 420 may launch a game client 426 and perform one or more game interactions with the electronic game session 414. For example, the second server 420 may join the electronic game session 414 hosted by the first server 410, view a live broadcast of the electronic game session 414 or visit a virtual store associated with the electronic game session 414 to purchase virtual game items.

Figure 5:
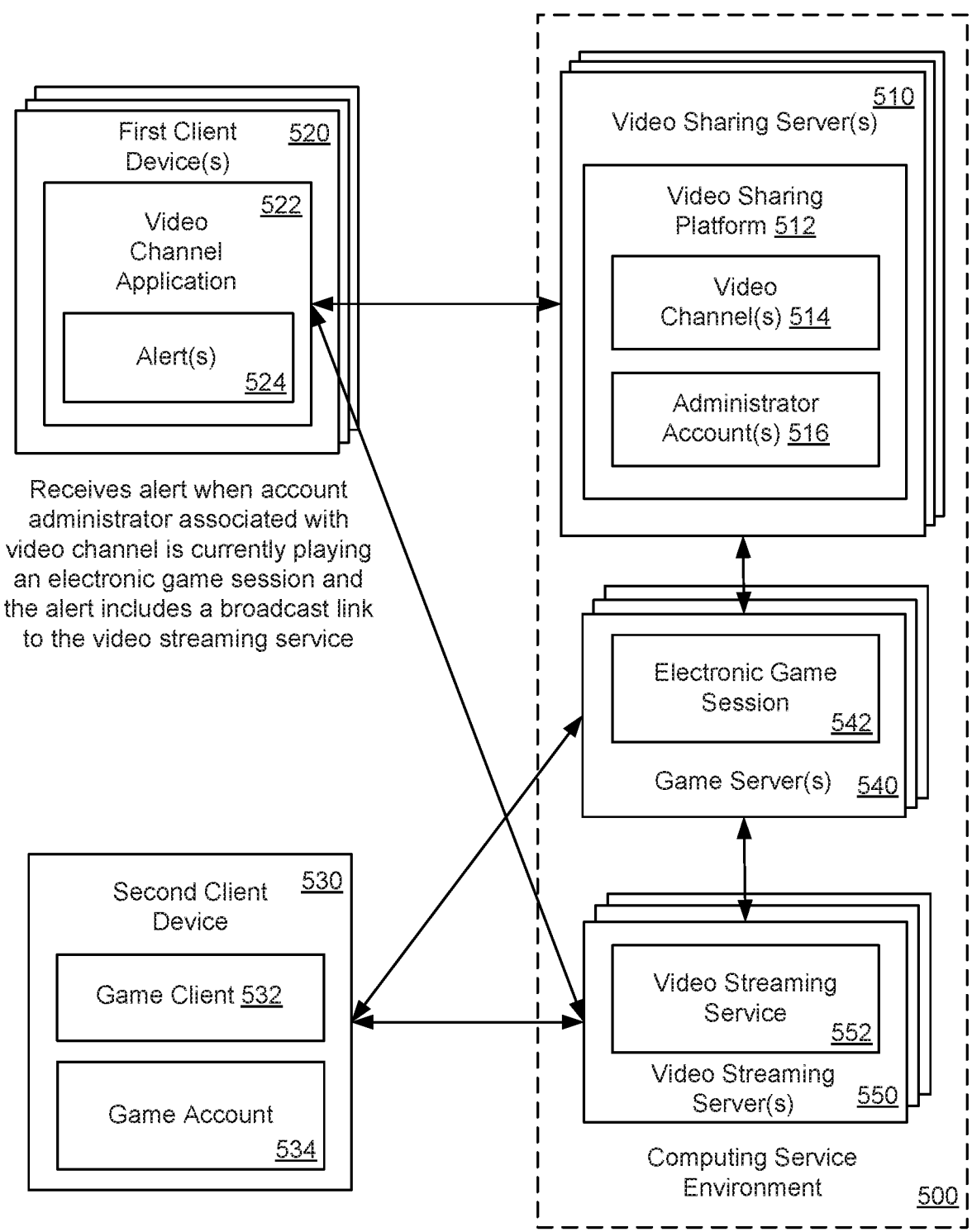
FIG. 5 illustrates a system and related operations for providing alerts to a video channel application according to an example of the present technology.

FIG. 5 illustrates an example of a system and related operations for providing alerts to video channel applications. A first client device 520 may execute a video channel application 522 that is dedicated to a video channel 514 in a video sharing platform 512, and the video sharing platform 512 may operate on a video sharing server 510. In other words, the video channel 514 may include one or more videos that are accessible via the video channel application 522 installed on the first client device 520. As an example, the video channel 514 may be dedicated to a particular channel administrator that often plays electronic games, and video gameplays of the electronic games from the channel administrator may be uploaded to the video channel 514 in the video sharing platform 512. The video channel application 522 may be created when the video channel 514 has a defined number of subscribers or a defined number of channel views over a defined time period. In addition, the video channel 514 may be associated with an administrator account 516, which may include profile information of the channel administrator associated with the video channel 514.

In one example, the channel administrator associated with the video channel 514 may utilize a second client device 530. The second client device 530 may execute a game client 532, and the game client 532 may connect to an electronic game session 542 hosted by a game server 540. The electronic game session 542 may be related to the video channel 514. In addition, the channel administrator may broadcast a live gameplay of the electronic game session 542 via a video streaming service 552. The video streaming service 552 may operate on a video streaming server 550. A game account 534 associated with the second client device 530 may indicate or track when the second client device 530 is currently connected to an electronic game session 542. In addition, the game account 534 may indicate or track when the electronic game session 542 is currently being broadcasted via the video streaming service 552.

In one example, the game account 534 of the channel administrator may be paired or connected to the administrator account 516 that corresponds with the administrator's video channel 514, and information from the game account 534 may be available to the administrator account 516. Therefore, the video sharing server 510 that operates the video sharing platform 512 may detect when the administrator account 516 indicates that the second client device 530 is currently connected to the electronic game session 542 hosted on the game server 540 (i.e., when the second client device 530 is currently playing an electronic game related to the video channel 514). In addition, the video sharing server 510 that operates the video sharing platform 512 may detect when the administrator account 516 indicates that the electronic game session 542 is currently being broadcasted via the video streaming service 552.

In one example, the video sharing platform 512 may send an alert 524 to the video channel application 522 executing on the first client device 520. The alert 524 may indicate that the channel administrator associated with the video channel 514 is currently playing an electronic game and a live gameplay of the electronic game session 542 is being broadcasted via the video streaming service 552. In addition, the alert 524 may include an electronic link that, when activated by the first client device 520, enables the first client device 520 to view the live gameplay via the video streaming service 552. As another example, the alert 524 may include an electronic link that, when activated by the first client device 520, may connect the first client device 520 to an electronic retail store that sells retail merchandise (e.g., physical goods) associated with the administrator's video channel 514 in the video sharing platform 512. As a result, a user associated with the first client device 520 may be alerted via the video channel application 522 when the channel administrator is currently playing an electronic game, and the user may be provided with an electronic link that allows the user to watch a live broadcast of the electronic game via the video streaming service 552.

In one example, the first client device 520 may receive an alert 524 via the video channel application 522, and the alert 524 may include broadcast links that enable the first client device 520 to connect to the video streaming service 552 to view live broadcasts of related electronic game sessions. As a result, the user associated with the first client device 520 may be exposed to related electronic game sessions, and the user may be provided with the option to view these related electronic game sessions.

Figure 6:
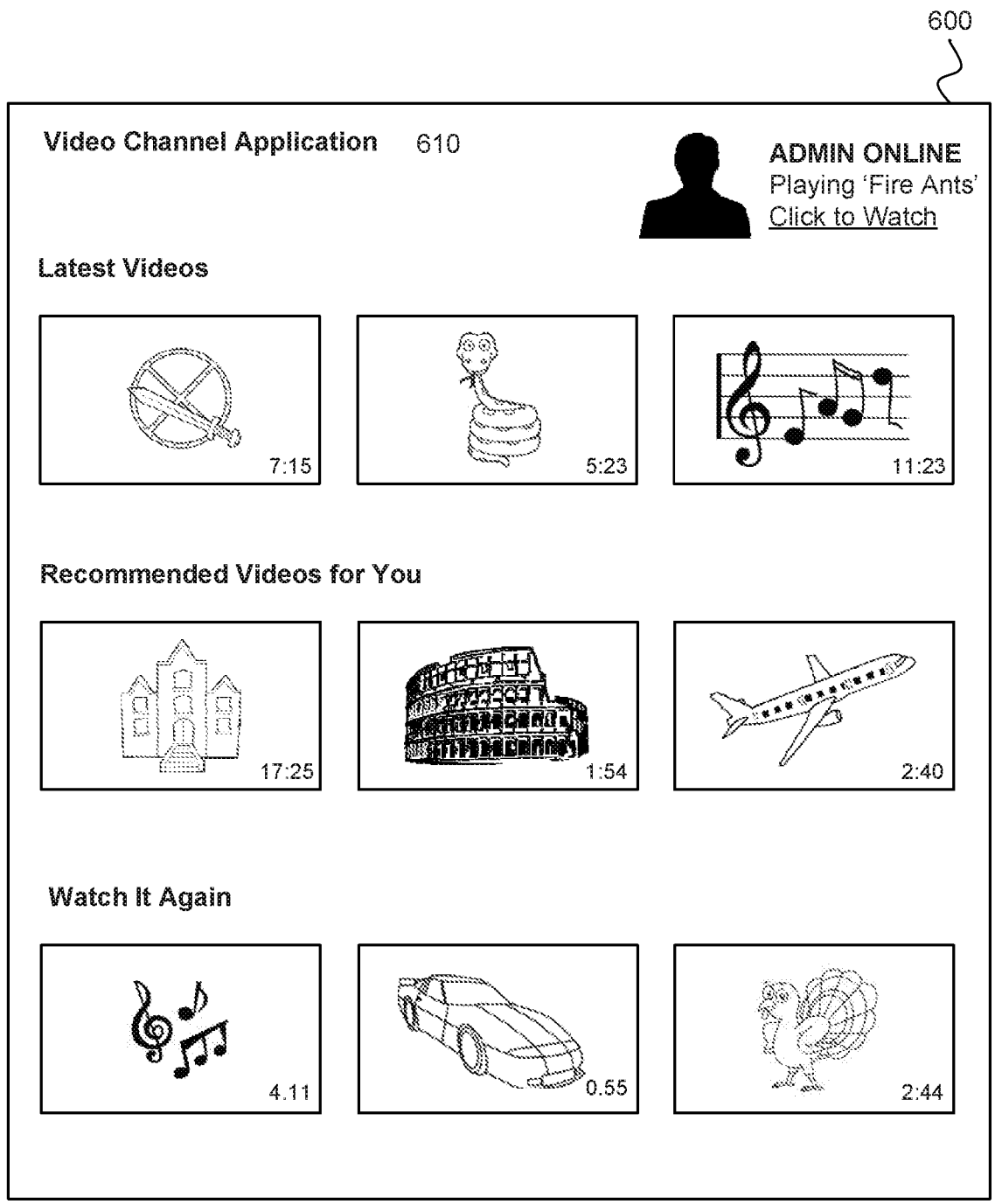
FIG. 6 illustrates a graphical interface for a video channel application that indicates when a video channel administrator is currently playing an electronic game according to an example of the present technology.

FIG. 6 illustrates an example of a graphical interface 600 for a video channel application 610 that indicates when a video channel administrator is currently playing an electronic game. The video channel application 610 may be owned by the video channel administrator. In other words, the video channel application 610 may provide a list of videos uploaded by the video channel administrator. The video channel application 610 may be designed to include various categories, such as latest videos, recommended videos that are personalized for the user that is viewing the video channel application 610, videos that have been previously viewed, etc. In one example, the video channel application 610 may indicate when the video channel administrator is currently playing the electronic game. The video channel application 610 may indicate a name of the electronic game currently being played (e.g., 'Fire Ants'). In addition, the video channel application 610 may provide an electronic link to view a live broadcast of a gameplay of the electronic game currently being played. In other words, the video channel application 610 may provide an electronic link to a video streaming service that is broadcasting the gameplay of the electronic game. When the electronic link displayed in the video channel application 610 is activated, a new graphical interface may open to display the live gameplay of the electronic game.

Figure 7:
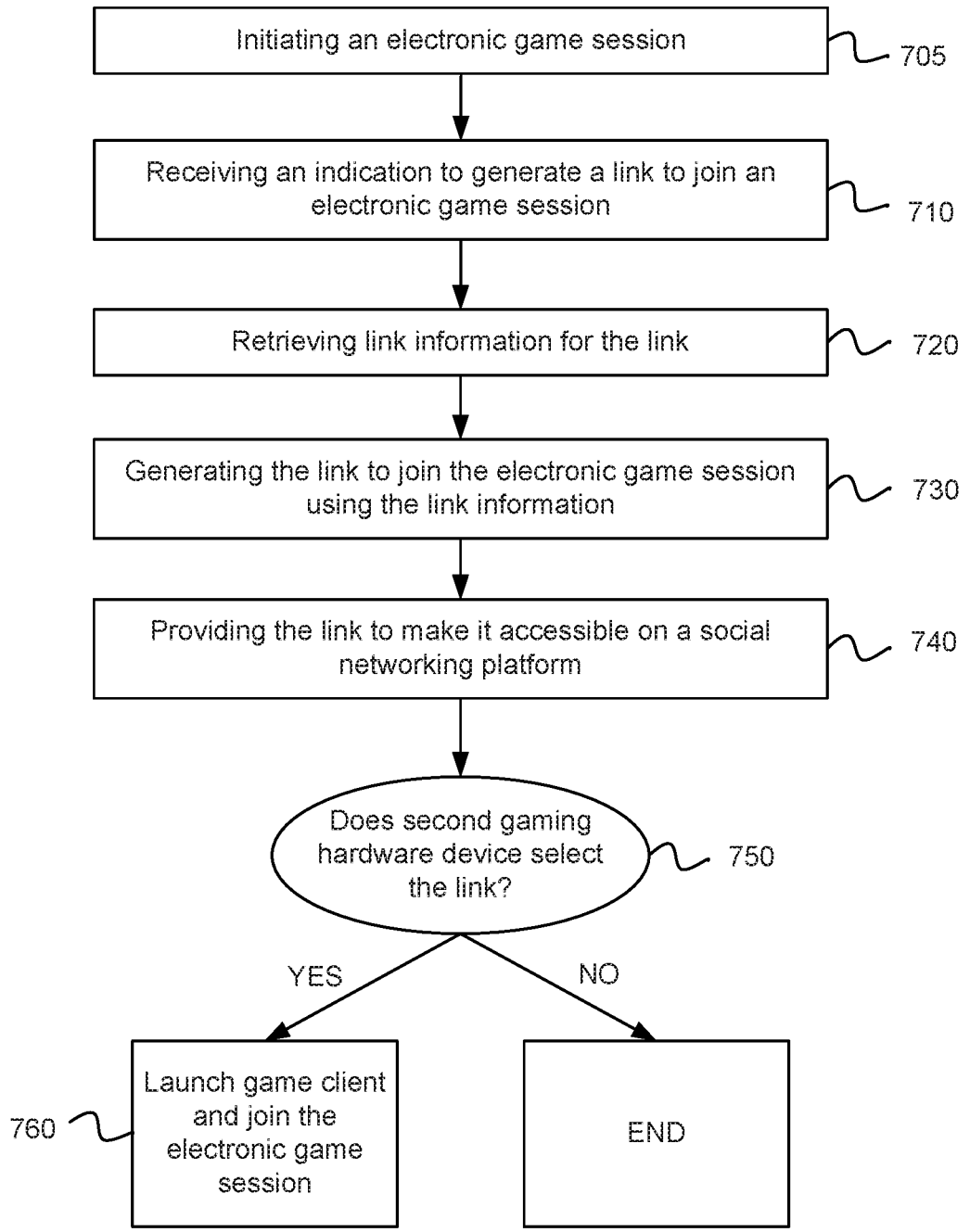
FIG. 7 is a flowchart of an example method for interacting with an electronic game.

FIG. 7 illustrates functionality of one or more non-transitory computer-readable storage media. An electronic game session may be initiated, as in block 705. The electronic game session may be hosted by a game server in a computing service environment. In one example, the game server may initiate the electronic game session.

An indication may be received from a first hardware device, as in block 710. The indication may be to generate a link to join the electronic game session. The game server may receive the indication from the first hardware device. In one example, a user associated with the first hardware device may provide the indication via a user interface.

Link information for the link may be retrieved, as in block 720. The link information may be retrieved at the game server. The link information may include one or more parameters associated with the electronic game session, and the one or more parameters may be included in the electronic link. The game server may maintain the link information for the electronic game session.

The link to join the electronic game session may be generated to include the link information, as in block 730. The link may be generated at the game server. The link may be a uniform resource indicator (URI), such as a uniform resource locator (URL) which includes the link information. In addition, the link may be a hypertext transfer protocol (HTTP) link.

The link may be provided to make it accessible on a social networking platform, as in block 740. The link may be provided by the game server to the social networking platform. The link may allow a second hardware device to activate or obtain the link on the social networking platform and join the electronic game session hosted by the game server in the computing service environment. In other words, the second gaming hardware device may activate the link on the social networking platform, and the link information embedded in the link may enable the second gaming hardware device to join the electronic game session.

In one example, the second gaming hardware device may determine when the link published on the social networking platform is activated, as in block 750. When the link is activated, the second gaming hardware device may launch a game client and join the electronic game session, as in block 760.

In one example, instructions may be received to generate a broadcast link to watch a broadcast of the electronic game session. The broadcast link may be generated to include link information that corresponds to the broadcast of the electronic game session. The broadcast link may be provided to make it accessible on the social networking platform, and the broadcast link may enable the second hardware device to view the broadcast of the electronic game session.

In one example, instructions may be received to generate a retail link to launch a virtual store within the electronic game session. The retail link may be generated to include link information that corresponds to the virtual store within the electronic game session. The retail link may be provided to make it accessible on the social networking platform, and the link may enable the second hardware device to launch the virtual store within the electronic game session and purchase one or more virtual game items associated with the electronic game session.

In one example, the first hardware device may generate an information link that is directed towards a data store associated with the game server. The data store may include additional game information associated with the electronic game session. The second hardware device may be configured to access the additional game information via the information link.

Figure 8:
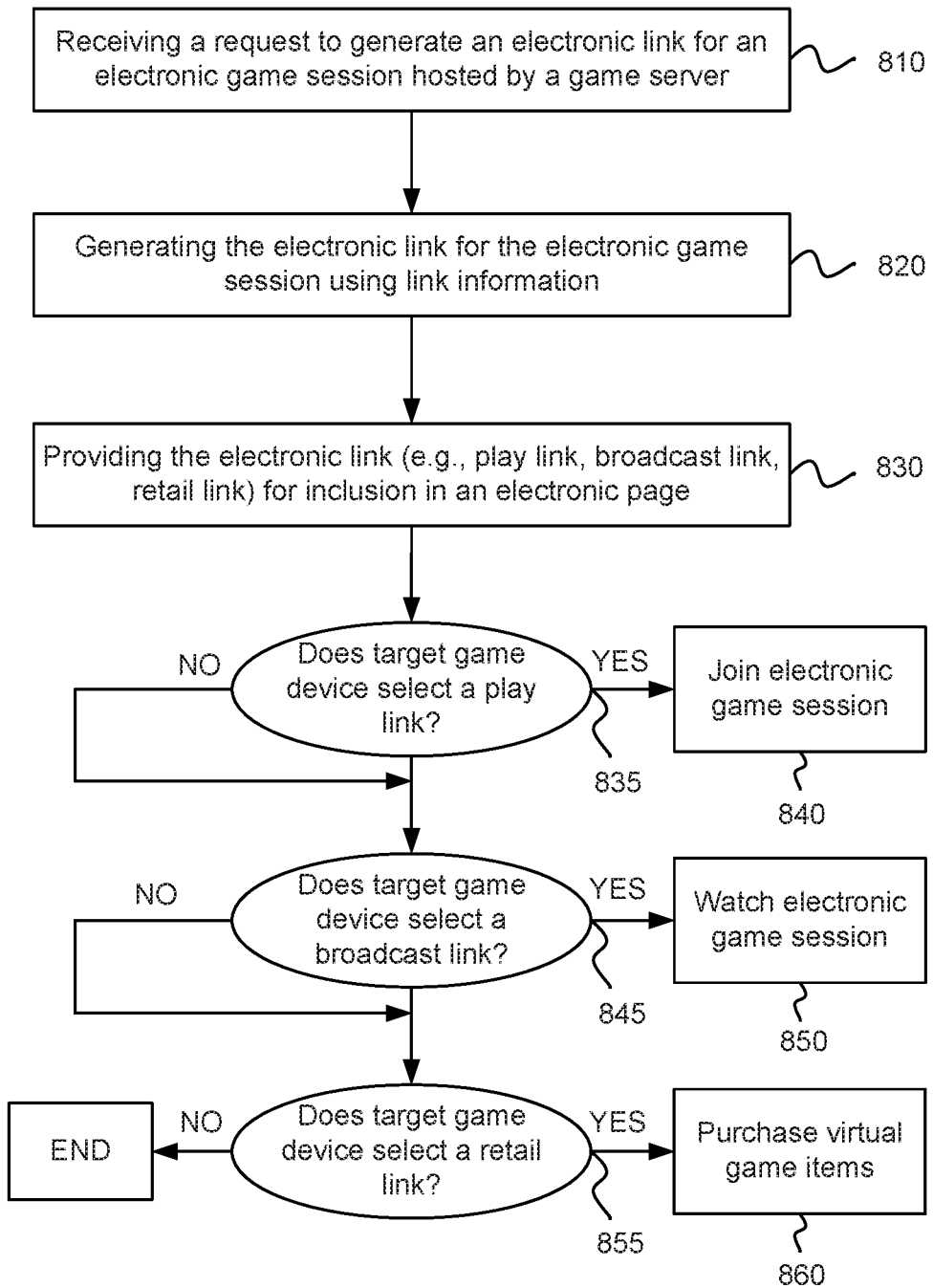
FIG. 8 is a flowchart of another example method for interacting with an electronic game.

FIG. 8 illustrates an example of a method for electronic game interactions. A request may be received to generate an electronic link for an electronic game session hosted by a game server in a computing service environment, as in block 810. The request may be received at the game server. A gaming device may include a game client that launches the electronic game session and connects to the game server. The instructions may be received from a user associated with a target gaming device via a user interface. The electronic link may enable the target gaming device to perform one or more game interactions with the electronic game session.

The electronic link for the electronic game session may be generated to include link information, as in block 820. The electronic link may be generated at the game server. The link information may include one or more parameters associated with the electronic game session. In one example, the electronic link may be generated to include an electronic game specific link for launching the electronic game on the target gaming device, and the electronic link provided to the target gaming device may be a hypertext transfer protocol (HTTP) link.

The electronic link may be provided for inclusion in an electronic page, as in block 830. The electronic link may be provided from the game server to the electronic page. The electronic page may be included in a social networking platform that is associated with the gaming device and the electronic page is accessible to the target gaming device. In one configuration, an activation of the electronic link by a target gaming device may enable the target gaming device to launch a game client to perform one or more game interactions with the electronic game session. As an example, the activation of the electronic link may enable the target gaming device to launch the game client to perform the game interaction of joining the electronic game session. As another example, the activation of the electronic link may enable the target gaming device to launch the game client to perform the game interaction of viewing a live gameplay of the electronic game session via a broadcast channel. As yet another example, the activation of the electronic link may enable the target gaming device to launch the game client to perform the game interaction of launching a virtual store within the electronic game session to purchase one or more virtual game items associated with the electronic game session.

In one example, the target gaming device may determine that the electronic link that is activated is a play link, as in block 835, and then the target gaming device may join the electronic game session, as in block 840. In another example, the target gaming device may determine that the electronic link that is activated is a broadcast link, as in block 845, and then the target gaming device may watch the electronic game session via a broadcast, as in block 850. In yet another example, the target gaming device may determine that the electronic link that is activated is a retail link, as in block 855, and then the target gaming device may visit a virtual store within the electronic game session to purchase virtual game items, as in block 860.

In one example, the gaming device may detect that one or more predefined events have occurred in the electronic game session. The gaming device may provide the electronic link for inclusion in an electronic message. The electronic message may be automatically transmitted to a predefined set of user accounts after detection of the one or more predefined events.

In one example, the activation of the electronic link may enable the target gaming device to connect to an electronic retail store and download the electronic game when the electronic game is not installed on the target gaming device. In another example, the activation of the electronic link may enable the target gaming device to connect to a virtual retail store and be gifted one or more virtual game items from the virtual retail store, and the one or more virtual game items to be gifted may be selected by the gaming device.

In one example, link generation functionality may be provided to game developers through a software development kit (SDK) in an integrated development environment (IDE). The generation functionality may be accessible during software development of an electronic game. In one example, an authorization may be received from a source gaming device that permits the game server to provide the electronic link for inclusion in the electronic page.

Figure 9:
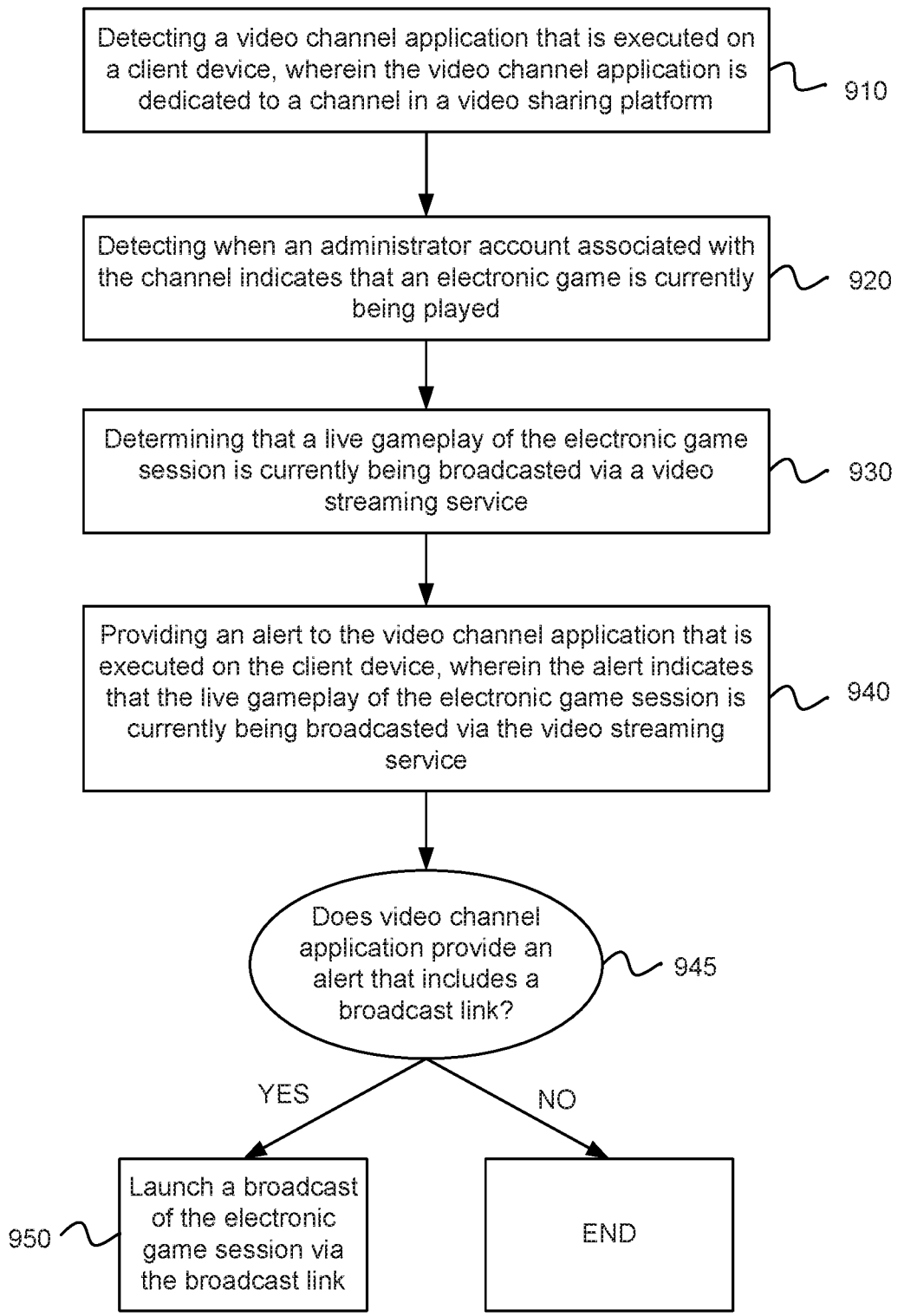
FIG. 9 is a flowchart of an example method for providing alerts to a video channel application.

FIG. 9 illustrates an example of a method for providing alerts to a video channel application. A server may detect a video channel application that is executed on a client device, as in block 910. The video channel application may be dedicated to a channel in a video sharing platform and the channel may include one or more videos that are accessible via the video channel application. In one example, the video channel application that is dedicated to the channel in the video sharing platform may be created when the channel has a defined number of subscribers or a defined number of channel views over a defined time period.

A server may detect when an administrator account associated with the channel indicates that an electronic game related to the channel is currently being played, as in block 920. In other words, the channel may be dedicated to an administrator, and the server may determine that the administrator is currently playing an electronic game based on the administrator account. The administrator account may indicate a name of the electronic game currently being played.

The server may determine that a live gameplay of an electronic game session is currently being broadcasted via a video streaming service based on the administrator account, as in block 930. In other words, the administrator account may also indicate that the live gameplay of the electronic game session is currently being broadcasted via the video streaming service. The administrator account may be connected to a game account of the administrator, and the game account may indicate when the administrator is currently playing the electronic game and a live gameplay is being broadcasted via the video streaming service.

The server may provide an alert to the video channel application that is executed on the client device, as in block 940. The alert may indicate that the live gameplay of the electronic game is currently being broadcasted via the video streaming service. In one example, the server may generate the alert to include a broadcast link that connects to the live gameplay being broadcasted via the video streaming service. The broadcast link may include link information associated with the live gameplay being broadcasted. Alternatively, the server may generate the alert to include broadcast links that connect with the video streaming service to view live broadcasts of electronic game sessions that are in a same game category as the electronic game session currently played by the channel administrator.

In one example, the video channel application may determine that the alert includes a broadcast link, as in block 945. The video channel application may launch a broadcast of the electronic game session via the broadcast link, as in block 950. For example, the video channel application may launch a video streaming application installed on the client device, and the video streaming application may open the broadcast of the electronic game session via the broadcast link.

In one example, the alert may include a link to connect with an electronic retail store. The electronic retail store may include retail merchandise that is associated with the channel in the video sharing platform and the link may include link information associated with the electronic retail store.

Figure 10:
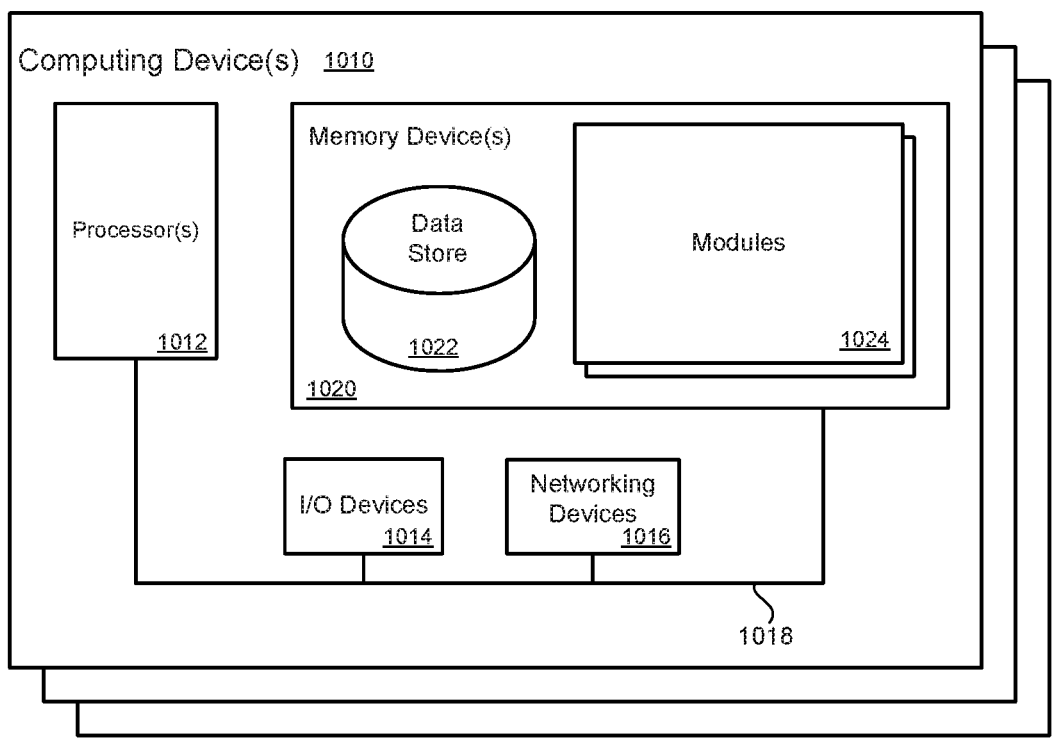
FIG. 10 is a block diagram that provides an example illustration of a computing device that may be employed in the present technology.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. One or more non-transitory computer-readable storage media having stored thereon instructions that, upon execution on at least one computing node of a plurality of computing nodes, cause the at least one computing node to perform operations comprising:
   initiating an electronic game session, wherein the electronic game session is hosted by a game server in a computing service environment;
   receiving an indication from a first hardware device to generate a link to join the electronic game session;
   retrieving link information for the link, wherein the link information includes one or more game parameters associated with the electronic game session that are to be included in the link, the one or more game parameters including a virtual location within the electronic game session and game session parameters;
   generating the link to join the electronic game session to include the link information; and providing the link to make it accessible on a social networking platform, wherein the link allows a second hardware device to activate the link on the social networking platform and join the electronic game session hosted by the game server in the computing service environment at the virtual location using the game parameters included in the link wherein the link further allows the second hardware device to connect to a virtual retail store and be gifted one or more virtual game items from the virtual retail store for use in the electronic game session.

2. The one or more non-transitory computer-readable storage media of claim 1, further comprising instructions that, upon execution on the at least one computing node of the plurality of computing nodes, cause the at least one computing node to perform:
receiving an indication from the first hardware device to generate a retail link to launch a virtual store within the electronic game session;
generating the retail link to include link information that corresponds to the virtual store within the electronic game session; and
providing the retail link to make it accessible on the social networking platform, wherein the link enables the second hardware device to launch the virtual store within the electronic game session and purchase one or more virtual game items associated with the electronic game session.

3. The one or more non-transitory computer-readable storage media of claim 1, wherein the link that enables the second hardware device to connect with the electronic game session is a hypertext transfer protocol (HTTP) link.

4. A method for electronic game interactions, the method comprising:
receiving a request to generate an electronic link for an electronic game session hosted by a game server in a computing service environment, wherein the electronic link enables one or more game interactions to be performed with the electronic game session;
generating the electronic link for the electronic game session to include link information, wherein the link information includes game parameters associated with the electronic game session that are to be included in the electronic link, the one or more game parameters including a virtual location within the electronic game session and game session parameters; and
providing the electronic link for inclusion in an electronic page, wherein activation of the electronic link by a target gaming device enables the target gaming device to perform a game interaction at the virtual location within the electronic game session using the game parameters included in the electronic link, and wherein the activation of the electronic link enables the target gaming device to connect to a virtual retail store and be gifted one or more virtual game items from the virtual retail store for use in the electronic game session.

5. The method of claim 4, wherein the activation of the electronic link enables the target gaming device to launch a game client to perform the game interaction of joining the electronic game session.

6. The method of claim 4, wherein the activation of the electronic link enables the target gaming device to launch a game client to perform the game interaction of launching a virtual store within the electronic game session to purchase one or more virtual game items associated with the electronic game session.

7. The method of claim 4, further comprising providing a link generation functionality to game developers through a software development kit (SDK) in an integrated development environment (IDE), wherein the link generation functionality is accessible during software development of an electronic game.

8. The method of claim 4, further comprising:
detecting that one or more predefined events have occurred in the electronic game session; and
providing the electronic link for inclusion in an electronic message, wherein the electronic message is automatically transmitted to a predefined set of user accounts after detection of the one or more predefined events.

9. The method of claim 4, wherein the activation of the electronic link enables the target gaming device to connect to an electronic retail store and download the electronic game when the electronic game is not installed on the target gaming device.

10. The method of claim 4, further comprising generating the electronic link to include an electronic game specific link for launching the electronic game on the target gaming device, wherein the electronic link provided to the target gaming device is a hypertext transfer protocol (HTTP) link.

11. The method of claim 4, further comprising receiving an authorization from a source gaming device that permits the game server to provide the electronic link for inclusion in the electronic page.

12. A system, comprising:
at least one processor;
at least one memory device including a data store to store a plurality of data and instructions that, when executed, cause the system to:
identify link information for a link to join an electronic game session, wherein the link information includes game parameters associated with the electronic game session that are to be included in the link, the game parameters including a virtual location within the electronic game session and game session parameters;
generate the link to include the link information; and
provide the link on an electronic page to enable the electronic game session to be joined at the virtual location using the game parameters included in the link, wherein the link further enables a connection to a virtual retail store and a gifting of one or more virtual game items from the virtual retail store for use in the electronic game session.

13. The system of claim 12, wherein the plurality of data and instructions, when executed, cause the system to: initiate the electronic game session that is hosted by a game server in a computing service environment.

14. The system of claim 12, wherein the plurality of data and instructions, when executed, cause the system to: receive an indication from a first hardware device to generate the link to join the electronic game session.

15. The system of claim 12, wherein the plurality of data and instructions, when executed, cause the system to: provide the link to allow a second hardware device to activate the link on the electronic page and join the electronic game session.

16. The system of claim 12, wherein the electronic page is associated with a social networking platform.

17. The system of claim 12, wherein the electronic page is associated with an electronic message.

18. The system of claim 12, wherein the link that enables the electronic game session to be joined is a hypertext transfer protocol (HTTP) link.

19. The system of claim 12, wherein the plurality of data and instructions, when executed, cause the system to: provide a link generation functionality to game developers through a software development kit (SDK) in an integrated development environment (IDE), wherein the link generation functionality is accessible during software development of an electronic game.

\* \* \* \* \*